Figure 1:
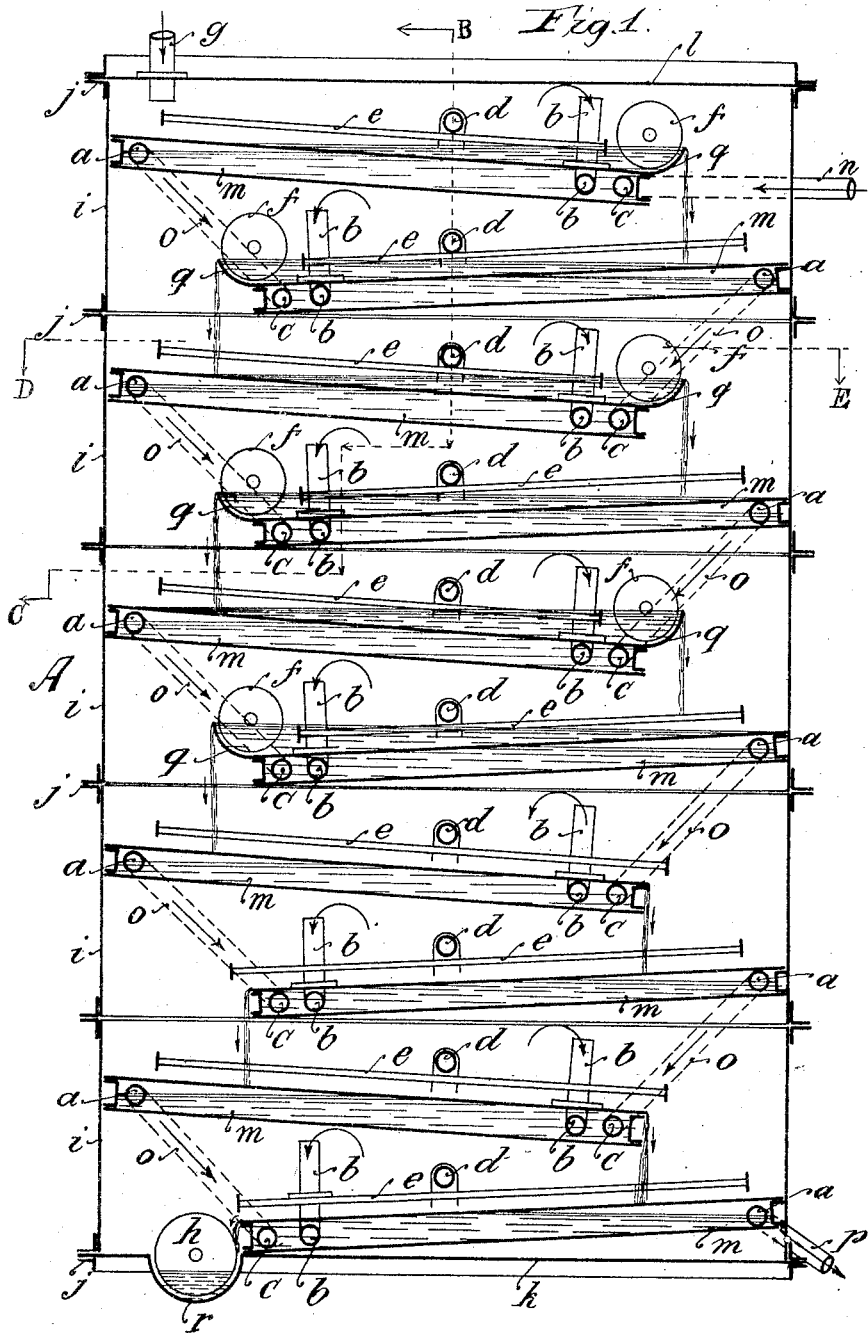

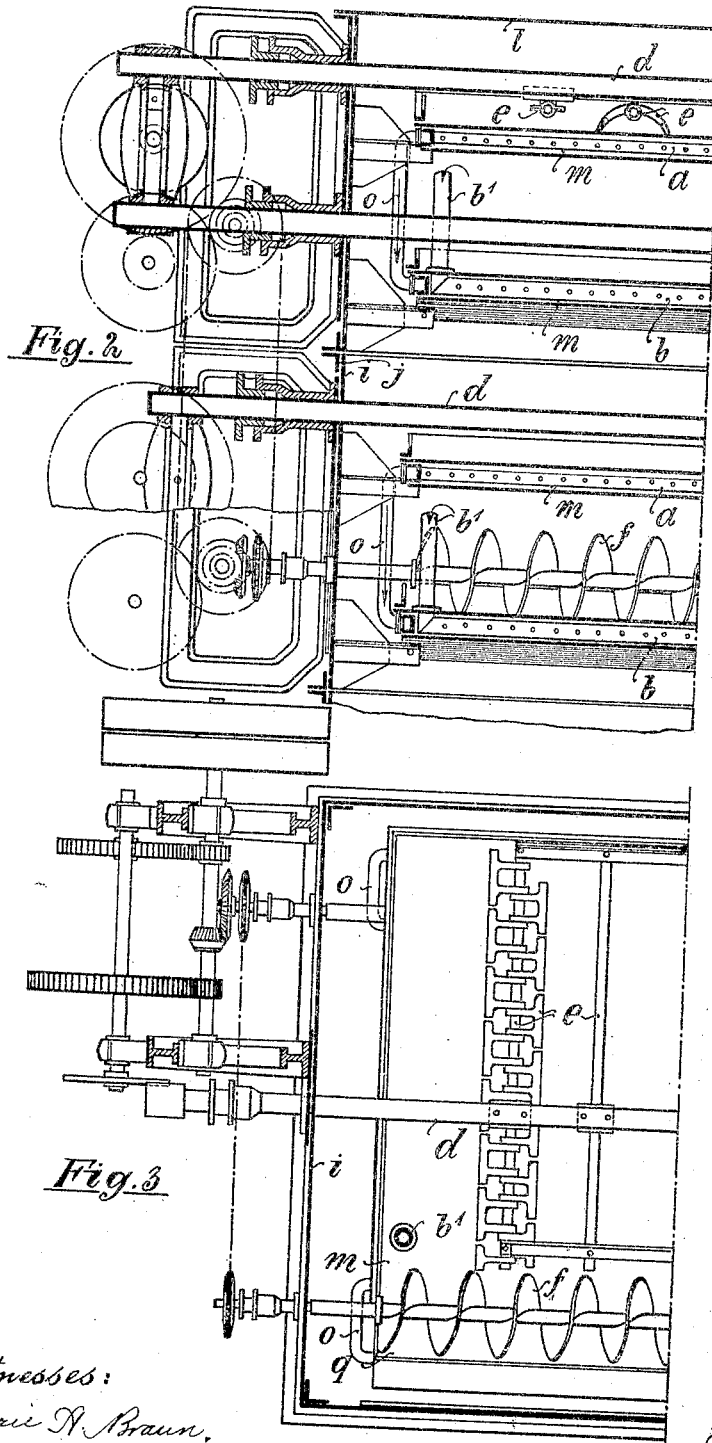

UNITED STATES PATENT OFFICE.

HANS KAYSER, OF NUREMBERG, GERMANY.

EVAPORATING APPARATUS.

1,036,637.

Specification of Letters Patent.

Patented Aug. 27, 1912.

Application filed July 28, 1911. Serial No. 641,116.

*To all whom it may concern:*

Be it known that I, HANS KAYSER, a citizen of the Empire of Germany, residing at Nuremberg, in the Empire of Germany, have invented a new and useful Evaporating Apparatus, of which the following is a specification.

My invention consists of an evaporating apparatus for carrying into effect most diversified processes of thickening or concentrating solutions by evaporation, or of drying materials, in which a Honigmann's brine, that is a mixture of a solution of caustic soda ($NaOH$) and of a solution of calcium chlorid ($CaCl_2$), is employed as a heating medium. Thereby the advantage is obtained, that the heating brine possesses but a slight pressure under that prevailing in the evaporating or drying space. In consequence of this the apparatus does not require any complicated strengthening means, such as stays, rivets, and the like, so that it can be constructed in a simple and cheap manner.

According to my invention the apparatus consists of a casing composed of superposed sections, a number of flat low closed vessels so superposed in the casing, as to leave between them a serpentine channel rising from bottom to top, and a number of scrapers, one for each vessel and sweeping its top surface and means for transversely reciprocating the scrapers. The Honigmann brine is supplied through a tube to the uppermost vessel and passes from thence through the various vessels and the tubes connecting them together downward, while absorbing the vapor or steam arising from the liquid or material on the vessels and at the same time liberating heat, which in turn is utilized for further evaporating the liquid or drying the material.

I will now proceed to describe my invention with reference to the accompanying drawings in which—

Figure 1 represents a vertical longitudinal section through an evaporating apparatus. Fig. 2 illustrates on an enlarged scale, in section on line B—C of Fig. 1, part of the apparatus, and Fig. 3 is a cross section on line D—E of Fig. 1; both figures to be seen in the direction of the arrows.

A denotes a casing, which is shown to be composed of several superposed sections $i$ $i$ of rectangular cross section, a bottom $k$ and a top $l$. The sections $i$ $i$ have flanges $j$ $j$, which can be bolted together. Each section $i$ is shown to contain two superposed oppositely inclined flat closed vessels $m$ $m$, which may be supposed to extend over the whole width of the section $i$ and reach from one side wall to a point near the opposite side wall. They may be fastened to the walls of the section $i$ in any known manner and leave between them a serpentine channel rising from the bottom $k$ to the top $l$. Each vessel $m$ is shown to be composed of a frame from U-iron and two plates forming respectively the bottom and the top. Within the vessel $m$ three perforated tubes $a$ $b$ $c$ are disposed, one at the higher end, another at the lower end and the third near the second, and all these tubes extend over the whole width of the vessel. The lower tube $c$ of the uppermost vessel $m$ may be connected with a tube $n$ leading to some source of heated Honigmann brine. The upper tube $a$ of each vessel (excepting the lowest) is shown to be connected by means of a tube $o$ on the outside of the section $i$ with the lower tube $c$ of the next lower vessel $m$. The upper tube $a$ of the lowest vessel $m$ may be connected with a tube $p$ leading to some boiler or the like. The tube $b$ of each vessel $m$ communicates with an upright tube $b^1$, which projects from the vessel near one wall and is open at the upper end. The perforations of the tubes $a$ $b$ $c$ are preferably made fine, and their number should be large. The plates forming the tops of the six upper vessels $m$ $m$ are shown to be bent at the lower end upward so as to form a trough $q$, in which any liquid is kept, so that its level extends to the upper end of the top of the vessel. A conveyer $f$ of any known construction is mounted to turn in the trough $q$, its shaft passing through suitable stuffing-boxes (not shown) in the walls of the section $i$ and being arranged to be driven from without in any known manner. The conveyer $f$ is adapted to convey any precipitate through some opening (not shown) to a tube on the outside of the section $i$.

The bottom $k$ is shown to be made in one with a trough $r$, in which a conveyer $h$ is disposed. The trough $r$ serves for collecting all precipitates or bodies dropping off the lower vessels $m$ $m$ and the conveyer $h$ is adapted to transport the collected precipitates or bodies from the casing A to without.

The top $l$ is connected with a supply tube $g$ for the material to be freed from liquid or dried.

Two tubes $d$ $d$ are mounted in suitable stuffing-boxes (not shown) in the walls of each section $i$ to longitudinally reciprocate. They may be assumed to be connected by connecting rods with cranks on the outside of the vessel A, and the cranks may be assumed to be connected with gear wheels which mesh together and can be driven from without in any known manner. Each reciprocating tube $d$ is rigidly connected with a scraper $e$ of any known construction, which is adapted to sweep nearly the whole width of the top of the vessel $m$ without striking the rivet heads along the edges of the vessel. In general a wedge-shaped space may be left above the level of the brine in any vessel $m$ at its upper end and filled up with gases or vapors which can not be absorbed by the brine. For this reason preferably the upper end of each vessel $m$ is connected with a small tube (not shown) leading through the wall of the section $i$ into the ambient air.

The evaporating apparatus described operates as follows: The solution to be concentrated or the pulp to be dried by evaporation or any material to be dried is introduced into the apparatus through the tube $g$ at the top, and the respective gear is started for reciprocating the tubes $d$ $d$ with the scrapers $e$ $e$, also the various conveyers $f$ $f$ $h$ are set to operate. The heated Honigmann brine in its concentrated state is supplied from the source through the tube $n$ in the direction of the arrow, to the uppermost vessel $m$ and heats the liquid, pulp or other material above the top of this vessel. The vapor or steam developed from this liquid rises and passes in the direction of the arrow through the upright tube $b^1$ and the perforated tube $b$ into the brine, where it is absorbed, so that the brine is a little diluted. After its passage upward the somewhat diluted brine escapes from the vessel $m$ through the perforated tube $a$ and passes through the tube $o$ to the next lower vessel $m$, where it passes from the perforations of the tube $c$ upward while heating the liquid, pulp or other material on the vessel $m$ and being further diluted by the absorption of the vapor or steam entering the vessel $m$ through the upright tube $b^1$. It is to be noted, that heat is liberated by the liquefaction of the absorbed vapor or steam, so that the brine is reheated and enabled to further evaporate the liquid, pulp or other material above the top of the vessel. Evidently the same occurrences described will repeat during the passage of the brine through each of the lower vessels $m$, so that the brine leaving the lowermost vessel $m$ through the tube $p$ will be considerably diluted. In consequence of this the brine requires to be concentrated by evaporation in any known manner, before it can again be supplied to the apparatus for repeating its circulation. For example the brine may be concentrated in a known apparatus with several consecutive boilers or in an apparatus heated by exhaust-steam, in which case frequently a great saving in combustibles may be made. The liquid admitted to the apparatus through the tube $g$ is gradually concentrated during its passage over the several superposed vessels $m$ $m$, it flowing over the upper edge of the trough $q$ from one vessel in the direction of the arrow to the next lower vessel, or over the lower edge of the flat top of one vessel direct to the top of the next lower vessel. The constantly reciprocating scrapers $e$ $e$ will scrape off any precipitate that may be formed, and thus keep clean the top surfaces of the vessels $m$ $m$, so that the evaporating power of the latter will be maintained at its maximum. The precipitates constantly turned over and if necessary scraped off by the scrapers $e$ $e$ will by reason of the inclination of the top of each vessel $m$ gradually move downward into the reach of the respective conveyer $f$, which will remove the precipitates from the trough $q$ to without, so that they can be collected and further treated or disposed of, as the case may be. The liquid flowing over the upper edge of the lowest trough $q$ will henceforward flow in a thin layer over the top surfaces of the lower vessels $m$ $m$ and thus be subjected to the energetic heating action of the vessels, whereby its concentration is accelerated. All precipitates or bodies, such as salts, impurities, or the like, that may be formed by the evaporation, scraped off and turned over in both directions by the scrapers $e$ $e$ will successively move down the several vessels $m$ $m$, until they arrive in the trough $r$, from whence they will be moved to without by the conveyer $h$ for further treatment or storage, as the case may be. The vapor or steam not absorbed by the brine in any vessel $m$ will move upward to the space at the higher end of the vessel from which space it can readily escape through the said small tube to without. This arrangement is permissible, since the overpressure within the apparatus does not amount to more than from half a meter to two meters water column. Of course, where so preferred, any vacuum or any other overpressure may be produced in the apparatus, but it is in all cases preferable to work the apparatus under a slight overpressure, since the apparatus can then be made simple and consequently cheap. The said overpressure is utilized for forcing the vapor or steam separated from the liquid, pulp or other material through the upright tubes $b^1$ $b^1$ and the perforated tubes $b$ into the Honigmann brine. Of course the casing A must be capable of withstanding the said overpressure.

The chief advantage of the new apparatus resides in the fact, that the Honigmann brine in the vessels $m$ $m$ does not possess any noticeable pressure over that prevailing in the space within the casing A between the several vessels $m$ $m$, so that leakages of these vessels are nearly excluded and the vessels do not require any strengthening means, such as stays, rivets, and the like. The upper plate of each vessel $m$ is riveted only along the edges, but is otherwise perfectly smooth, so that the scrapers $e$ can not possibly render untight any rivet or angle-joint.

The new apparatus is suitable for all strongly incrusting liquids, such as brine, sulfates, lyes, muddy liquids such as obtained in chemical industries, etc., where the incrustations are frequently obtained as valuable by-products, further for all liquids which strongly foam and require to be quickly concentrated in thin layers, such as for example milk, further for drying up bodies and materials of all kinds, such as parings of sugar-beets, potatoes, distiller's wash, spent malt, fecal substances, clarifier mud, brown-coal, peat, brown-coal briquet pulp, etc.

The described apparatus is for example useful for the production of coarse kitchen-salt from brine. Hitherto the coarse kitchen-salt has been obtained exclusively by means of salt-pans, since the known vacuum-apparatus with several consecutive boilers invariably furnish quite fine kitchen-salt. The theory generally adopted was, that for the production of coarse kitchen-salt a nearly complete rest of the brine during its concentration be necessary. With the new apparatus it is quite permissible for the brine to boil on the several vessels, since the small crystals formed on the upper vessels are with the aid of the scrapers enabled to gradually grow during their downward passage over the lower vessels. By adjusting the speed of the scrapers and conveyers it is possible to vary at will the size of the crystals obtained from all kinds of brines. The salts produced by the new apparatus are remarkable for the uniformity of their crystals.

Of course, the apparatus must be protected against loss of heat, and the heat lost externally must be replaced. This is done most simply by blowing steam through an adjustable valve into the steam chamber of the apparatus. The result thereby obtained is that the small excess pressure in the apparatus is kept at the same height and the apparatus always works uniformly. The higher the excess pressure is, the more vigorously does the steam enter the heating vessels and the greater is the yield of the apparatus. The steam inlet valve thus serves simultaneously for regulating the yield of the apparatus.

The evaporating apparatus can be varied in many respects without departing from the spirit of my invention.

I claim:

1. In an evaporating apparatus, the combination with a casing, of low closed vessels superposed in said casing and leaving between them a serpentine channel rising from bottom to top, means for supplying the material to be freed from liquid or dried to the top of said casing, scrapers adapted to reciprocate in the transverse direction over said vessels and to sweep off in the longitudinal direction any precipitate or body, means for reciprocating said scrapers, means for supplying a heating medium to the uppermost of said vessels, tubes so connecting said vessels as to cause the heating medium to pass downward through the several vessels, means for discharging the heating medium from the lowest of said vessels, and means for discharging the material dropping off the lowest vessel from said casing.

2. In an evaporating apparatus, the combination with a casing, of low closed vessels alternately inclined in opposite directions and superposed in said casing while leaving between them a serpentine channel rising from bottom to top, means for supplying the material to be freed from liquid or dried to the top of said casing, scrapers adapted to reciprocate in the transverse direction over said vessels and to sweep off in the longitudinal direction any precipitate or body, means for reciprocating said scrapers, means for supplying a heating medium to the uppermost of said vessels, tubes so connecting said vessels as to cause the heating medium to pass downward through the several vessels, means for discharging the heating medium from the lowest of said vessels, and means for discharging the material dropping off the lowest vessel from said casing.

3. In an evaporating apparatus, the combination with a casing, of low closed vessels superposed in said casing and leaving between them a serpentine channel rising from bottom to top, perforated tubes in said vessels, open upright tubes on said vessels communicating with said perforated tubes, means for supplying the material to be freed from liquid or dried to the top of said casing, scrapers adapted to reciprocate in the transverse direction over said vessels and to sweep off in the longitudinal direction any precipitate or body, means for reciprocating said scrapers, means for supplying to the uppermost of said vessels a brine adapted to heat said vessels and to absorb through said upright tubes and said perforated tubes the vapor or steam separated from the material, tubes so connecting said vessels as to cause the brine to pass downward through the several vessels, means for discharging the diluted brine from the lowest of said vessels, and means for discharging the material dropping off the lowest vessel from said casing.

4. In an evaporating apparatus, the combination with a casing, of low vessels each consisting of a frame and two plane plates riveted to the top and bottom side of the frame, said low vessels being alternately inclined in opposite directions and superposed in said casing while leaving between them a serpentine channel rising from bottom to top, means for supplying the material to be freed from liquid or dried to the top of said casing, scrapers adapted to reciprocate in the transverse direction over said vessels and to sweep off in the longitudinal direction any precipitate or body, means for reciprocating said scrapers, perforated tubes in said vessels, open upright tubes on said vessels communicating with said perforated tubes, means for supplying to the uppermost of said vessels a brine adapted to heat said vessels and to absorb through said upright tubes and said perforated tubes the vapor or steam separated from the material, tubes so connecting said vessels as to cause the brine to pass downward through the several vessels, means for discharging the diluted brine from the lowest of said vessels, and means for discharging the material dropping off the lowest vessel from said casing.

5. In an evaporating apparatus, the combination with a casing, of low vessels each consisting of a frame and two plane plates riveted to the top and bottom side of the frame, said low vessels being alternately inclined in opposite directions and superposed in said casing while leaving between them a serpentine channel rising from bottom to top, means for supplying the material to be freed from liquid or dried to the top of said casing, scrapers adapted to reciprocate in the transverse direction over said vessels and to sweep off in the longitudinal direction any precipitate or body, means for reciprocating said scrapers, troughs at the lower ends of the upper of said vessels, conveyers in said troughs adapted to remove the precipitate through an opening in said casing, perforated tubes in said vessels, open upright tubes on said vessels communicating with said perforated tubes, means for supplying to the uppermost of said vessels a brine adapted to heat said vessels and to absorb through said upright tubes and said perforated tubes the vapor or steam separated from the material, tubes so connecting said vessels as to cause the brine to pass downward through the several vessels, means for discharging the diluted brine from the lowest of said vessels, and means for discharging the material dropping off the lowest vessel from said casing.

HANS KAYSER.

Witnesses:
ELISABETH HELLMUTH,
KATHARINA NAUCK.